C. K. TETER.
VALVE FOR NASAL INHALERS.
APPLICATION FILED SEPT. 9, 1912.

1,162,416.

Patented Nov. 30, 1915.

Witnesses:

Inventor
Charles K. Teter,
By Albert [illegible]
Attorney.

UNITED STATES PATENT OFFICE.

CHARLES K. TETER, OF CLEVELAND, OHIO, ASSIGNOR TO THE TETER MANUFACTURING COMPANY, OF CLEVELAND, OHIO, A CORPORATION OF OHIO.

VALVE FOR NASAL INHALERS.

1,162,416.  Specification of Letters Patent.  Patented Nov. 30, 1915.

Application filed September 9, 1912. Serial No. 719,388.

*To all whom it may concern:*

Be it known that I, CHARLES K. TETER, citizen of the United States, residing at Cleveland, in the county of Cuyahoga and State of Ohio, have invented certain new and useful Improvements in Valves for Nasal Inhalers, of which the following is a specification.

My invention relates to improvements in valves for nasal inhalers; the object thereof being to provide a device best adapted for the administration of anesthetics under the varying conditions met with in practice. An inhaler of this character preferably should be adapted for inducing anesthesia or analgesia in the patient, depending upon the character of the operation. Moreover, the device should be one which is capable of instant and easy manipulation and adjustment, to meet the exigencies of the operating room. Bearing these requirements in mind, I have produced a nasal inhaler providing a relief gas-valve, which is extremely sensitive to the respiration of the patient, yet it may be instantly adjusted to increase the pressure of the anesthetic, or be closed completely to the external air. The inhaler is designed primarily for use in administering nitrous oxid and oxygen in the relative proportions required, but it is equally adapted for inducing analgesia, by administering nitrous oxid mixed with atmospheric air under normal pressure. For the purpose of adapting my inhaler to both uses, I have provided a readily controllable air-inlet, which is designed for adjustment to admit varying volumes of air to the inhaler, or completely exclude the same.

Further details of my improved device, may be more readily explained by making reference to the accompanying sheet of drawings, wherein:—

Figure 1:
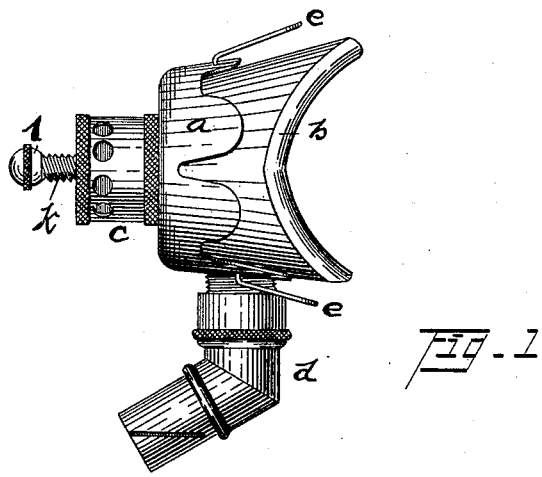
Figure 3:
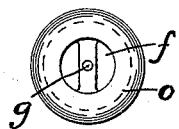
Figure 2:
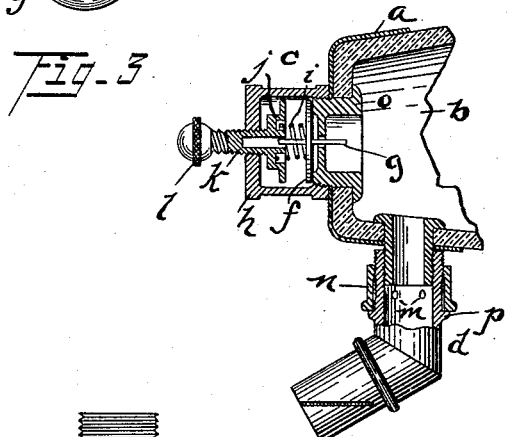
Figure 6:
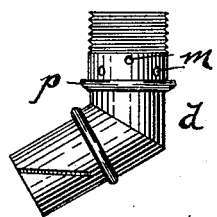
Figure 5:
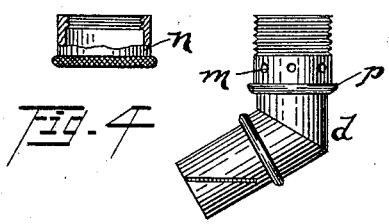

Figure 1, is a view in elevation of my improved nasal inhaler. Fig. 2, is a vertical sectional view thereof. Fig. 3, is an underside view of the valve, and Figs. 4, 5 and 6, illustrate the members comprising the air-vent in two slightly divergent forms.

Throughout the several figures of the drawings, I have employed the same character of reference to indicate similar parts.

The nasal inhaler is provided with a cup-shaped sheet-metal body $a$, which mounts the soft rubber cup $b$ of suitable shape, the valve $c$, and the gas inlet $d$. The inlet and cup are of the well known form, and require no further description. Wire-loops $e$ are secured to the body and furnish attachments for an elastic head-band, which is not shown.

Referring specifically to Fig. 2, the respiratory and relief valve $c$ is well shown in cross section. This comprises an aluminum disk $f$, having centering stems $g$, above and below for insuring the close and accurate seating of the valve disk $f$. The housing $h$ contains a light coiled spring $i$, which is sufficient merely to close the valve disk. Plunger $j$ is provided with a screw-thread $k$ of such pitch that said plunger will be forced against the valve disk $f$, and securely seat the same, to prevent its opening, by simply rotating the thumb-screw $l$ through a fraction over one complete turn or revolution.

The gas inlet $d$ is combined with an air-vent for diluting the nitrous oxid or other anesthetic. The walls of said vent are provided with a number of openings $m$, which normally are closed by the tapped sleeve $n$, which is forced against the annular shoulder $p$. These holes $m$ may be in staggered relation as shown in Fig. 6, or they may be in a continuous row about the body of the gas inlet, as indicated in Figs. 2 and 5; the former arrangement affording a somewhat finer adjustment of the air-supply.

In employing my inhaler to produce analgesia, nitrous oxid alone may be supplied through the gas inlet, while the air-vent is adjusted to furnish the requisite air-supply. This is accomplished merely by turning the tapped sleeve to expose sufficient air-ports or openings, through which the air may enter to mingle with the anesthetic. If oxygen and nitrous oxid are to be employed, however, the air-ports are sealed as shown in Fig. 2, and the patient, breathing through his nose, is caused to inhale the full supply of these gases mixed in the desired proportion. Valve $c$ is extremely sensitive, and will permit easy respiration, and the escape of surplus gases, if adjusted to relax the spring. The closure-disk being retained by its stems protruding both from above and below, will effectually exclude atmospheric air, as is necessary for inducing complete anesthesia. In order to regulate the valve, however, and continue anesthesia, the patient meantime breathing through the mouth, a slight turn of the thumb-screws serves effectually to close the valve against respiration, and the escape of the anesthetizing agent. This being supplied in sufficient volumes, the patient is compelled to breathe the proper mixture of nitrous oxid and oxygen, and consequently remains under its influence. A slight backward turn of the thumb-screw, will immediately release the valve, permitting it to perform its normal functions at any stage during the operation. Accordingly, it will be seen, that my improved valve and air-vent require but a moment for their individual adjustment, and may be depended upon under all emergencies. The attention of the operative is not distracted by manipulating numerous parts, but instead, the apparatus is so simple and effective that the minimum of attention thereto is required.

Having now described the preferred embodiment of my invention, I claim as new, and desire to secure by Letters Patent, the following:—

1. In a controllable relief valve for inhaling devices, the combination with a wide annular valve seat, of a light sheet-metal disk normally engaging the same, centering means associated with said disk adapted to retain the same in line with said valve seat, a light spring, an adjustable member and a rapid pitch screw acting against said member to adjust the tension of the spring, or alternatively engage said member positively with the closure disk, substantially as set forth.

2. In a relief and control valve for nasal inhalers, the combination with a wide annular valve seat, of a light sheet-metal valve part engaging the same, centering stems above and below said valve part adapted to retain the same in line with its valve seat, associated supports for said stems, a recessed closure disk, a light spring bearing within said recess and against the valve part, and a rapid pitch screw adapted to adjust the tension of the spring or engage the closure member positively with the valve seat, substantially as set forth.

In testimony whereof I do now affix my signature in the presence of two witnesses.

CHARLES K. TETER.

Witnesses:
H. W. BELL,
ALBERT LYNN LAWRENCE.

Copies of this patent may be obtained for five cents each, by addressing the "Commissioner of Patents, Washington, D. C."